US011194618B2

(12) United States Patent
Suzuki et al.

(10) Patent No.: US 11,194,618 B2
(45) Date of Patent: Dec. 7, 2021

(54) ACCELERATOR CONTROL DEVICE, ACCELERATOR CONTROL METHOD, AND RECORDING MEDIUM WITH ACCELERATOR CONTROL PROGRAM STORED THEREIN

(71) Applicant: NEC Corporation, Tokyo (JP)

(72) Inventors: Jun Suzuki, Tokyo (JP); Yuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 80 days.

(21) Appl. No.: 16/619,520

(22) PCT Filed: Jun. 7, 2018

(86) PCT No.: PCT/JP2018/021918
§ 371 (c)(1),
(2) Date: Dec. 5, 2019

(87) PCT Pub. No.: WO2018/230444
PCT Pub. Date: Dec. 20, 2018

(65) Prior Publication Data
US 2020/0151001 A1 May 14, 2020

(30) Foreign Application Priority Data
Jun. 13, 2017 (JP) .............................. JP2017-115862

(51) Int. Cl.
*G06F 9/48* (2006.01)
*G06F 9/50* (2006.01)
(Continued)

(52) U.S. Cl.
CPC .............. *G06F 9/4806* (2013.01); *G06F 9/48* (2013.01); *G06F 9/4843* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS

2011/0072234 A1\* 3/2011 Chinya ................. G06F 12/121
711/207
2013/0332931 A1 12/2013 Malewicz et al.
(Continued)

FOREIGN PATENT DOCUMENTS

JP   H11-249911 A   9/1999
JP   H11-265359 A   9/1999
(Continued)

OTHER PUBLICATIONS

Suzuki et al., "Victream: Accelerator Middleware for Resource Disaggregated Architecture", IPSJ SIG Technical Report, Aug. 8, 2016, vol. 2016-OS-138, No. 5, pp. 1-8.
(Continued)

*Primary Examiner* — Charles M Swift
(74) *Attorney, Agent, or Firm* — Sughrue Mion, PLLC

(57) ABSTRACT

This accelerator control device includes: a decision unit which, in processing flow information representing a flow by which a task generated according to a program executed by an accelerator processes data, decides, from among the data, temporary data temporarily generated during execution of a program; a determination unit which, on the basis of an execution status of the task by the accelerator and the processing flow information, determines, for every task using the decided data among the temporary data, whether or not execution of the task has been completed; and a deletion unit which deletes the decided data stored in a memory of the accelerator when execution of every task using the decided data has been completed, whereby, deg-
(Continued)

radation, of processing performance by an accelerator, which occurs when a size of data to be processed by the accelerator is large is avoided.

6 Claims, 11 Drawing Sheets

(51) Int. Cl.
*G06F 11/30* (2006.01)
*G06F 13/16* (2006.01)

(52) U.S. Cl.
CPC .............. *G06F 9/4881* (2013.01); *G06F 9/50* (2013.01); *G06F 9/5005* (2013.01); *G06F 9/5011* (2013.01); *G06F 9/5016* (2013.01); *G06F 9/5022* (2013.01); *G06F 11/30* (2013.01); *G06F 11/3006* (2013.01); *G06F 13/1657* (2013.01); *G06F 13/1663* (2013.01)

(58) Field of Classification Search
CPC .... G06F 9/5011; G06F 9/5016; G06F 9/5022; G06F 11/30; G06F 11/3006; G06F 13/1657; G06F 13/1663
See application file for complete search history.

(56) References Cited

U.S. PATENT DOCUMENTS

| | | | |
|---|---|---|---|
| 2017/0300362 A1* | 10/2017 | Liu | G06F 3/0631 |
| 2017/0344398 A1 | 11/2017 | Suzuki et al. | |
| 2018/0107506 A1 | 4/2018 | Suzuki et al. | |
| 2018/0270164 A1* | 9/2018 | Ahmed | G06F 9/5027 |
| 2018/0300243 A1* | 10/2018 | Pirvu | G06F 12/128 |
| 2019/0361844 A1* | 11/2019 | Mizuno | G06F 21/62 |

FOREIGN PATENT DOCUMENTS

| | | |
|---|---|---|
| WO | 2016/063482 A1 | 4/2016 |
| WO | 2016/181648 A1 | 11/2016 |

OTHER PUBLICATIONS

International Search Report for PCT/JP2018/021918 dated Sep. 11, 2018.
Written Opinion for PCT/JP2018/021918 dated Sep. 11, 2018 [PCT/ISA/237].
Japanese Office Action for JP Application No. 2019-525370 dated Jan. 26, 2021 with English Translation.

* cited by examiner

```
151 USER PROGRAM
1: DDD DDD1("inputFilePath1")
2: DDD DDD4("inputFilePath4")

3: TempDDD DDD3 = DDD1.map(P1).map(P2)
4: TempDDD DDD5 = DDD4.map(P3)
5: DDD3.zip(DDD5)
6: DDD6 = DDD3.map(P4)

7: DDD6.outputFile("outputFilePath")
```

Fig. 6

153 METADATA

| DP NAME | DP SIZE | TEMPORARY FLAG | SUBTASK USING DP | ... |
|---|---|---|---|---|
| DP2-1 | 128MB | 1 | ST2-1 | ... |
| DP2-2 | 128MB | 1 | ST2-2 | ... |
| DP2-3 | 128MB | 1 | ST2-3 | ... |
| ... | ... | ... | ... | ... |

Fig. 8

153 METADATA

| DP NAME | DP SIZE | TEMPORARY FLAG | SUBTASK USING DP | ... |
|---|---|---|---|---|
| DP8-1 | 128MB | 1 | ST6-1, ST6-2 | ... |
| DP8-2 | 128MB | 1 | ST6-1, ST6-2, ST6-3 | ... |
| DP8-3 | 128MB | 1 | ST6-2, ST6-3 | ... |
| ... | ... | ... | ... | ... |

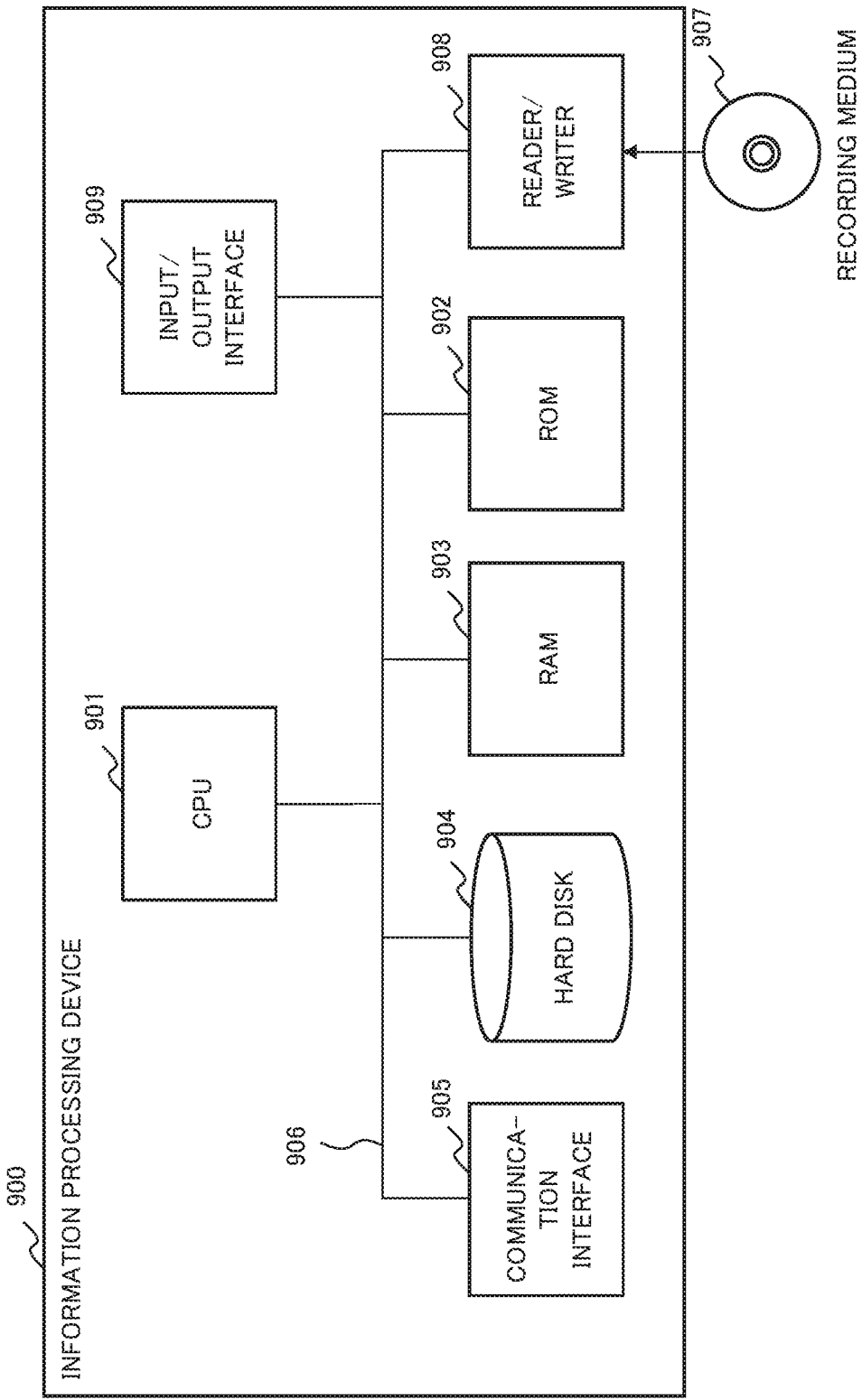

ACCELERATOR CONTROL DEVICE, ACCELERATOR CONTROL METHOD, AND RECORDING MEDIUM WITH ACCELERATOR CONTROL PROGRAM STORED THEREIN

This application is a National Stage Entry of PCT/JP2018/021918 filed on Jun. 7, 2018, which claims priority from Japanese Patent Application 2017-115862 filed on Jun. 13, 2017, the contents of all of which are incorporated herein by reference, in their entirety.

TECHNICAL FIELD

The present invention relates to a technique for controlling an accelerator communicably connected to a host computer in such a way as to act for the host computer with respect to specific information processing.

BACKGROUND ART

In general, in a computer system, an accelerator capable of executing a specific arithmetic operation at high speed is included and the specific arithmetic operation is executed by the accelerator instead of a host computer, and thereby information processing is accelerated. As a representative accelerator, for example, a graphics processing unit (GPU) capable of executing image processing at high speed is known. A demand for a technique for achieving higher-speed and efficient execution of information processing using such an accelerator is increasing.

As a technique relating to such a technique, PTL 1 discloses an accelerator control device including a generation unit and a control unit. The generation unit in the device generates a directed acyclic graph (DAG) representing a flow of processing based on a computer program to be executed. The control unit in the device controls, when data corresponding to a node in a DAG are stored on a memory included in an accelerator to be controlled, the accelerator in such a way as to execute processing corresponding to an edge in a DAG by using data stored on the memory.

Further, NPL 1 discloses an accelerator control system including an accelerator that processes data and a host computer that controls the accelerator. In the system, the host computer controls the accelerator in such a way as to divide one piece of processing data and execute processing on the basis of a unit (data partition) of the divided data. The host computer manages processing for data before division as a task, generates, from the task, processing to be executed for a data partition stored on a memory in the accelerator as a subtask, and instructs the accelerator to execute the subtask. A processor in the accelerator executes the instructed subtask by using the data partition stored on the memory.

CITATION LIST

Patent Literature

[PTL 1] International Publication No. WO 2016/063482

Non Patent Literature

[NPL 1] Jun Suzuki et al., "A Proposal of Accelerator Middleware "Victream" for Resource Separation Architecture", Summer United Workshops on Parallel, Distributed and Cooperative Processing in Matsumoto 2016 (SWoPP2016), OS-2, Aug. 1, 2016

SUMMARY OF INVENTION

Technical Problem

An information amount (a size of data) processed by an accelerator is increasing. Due to this situation, a case where a size of data to be processed by an accelerator is larger than a memory capacity included in the accelerator has frequently occurred. In such processing (in the present invention, hereinafter, referred to as "out-of-core processing") for data larger than a memory capacity, there is a problem in that processing performance based on an accelerator degrades. In other words, in out-of-core processing, an accelerator needs to proceed processing while evacuating data stored on a memory included therein, for example, to a memory of a host computer. In this case, when a bandwidth of an input/output (I/O) path connecting the accelerator and the host computer is narrow, processing performance based on the accelerator largely degrades. Either PTL 1 or NPL 1 does not specifically refer to this problem. A main object of the present invention is to provide an accelerator control device and the like that solve such a problem.

Solution to Problem

An accelerator control device according to one aspect of the present invention includes: decision means for deciding, in processing flow information representing a flow that tasks generated by a program executed by an accelerator process data being inputted to the tasks and outputted from the tasks, temporary data temporarily generated during execution of the program from among the data; determination means for determining, based on an execution status of the tasks by the accelerator and the processing flow information, whether or not execution is completed for all the tasks using decided data decided from among the temporary data; and deletion means for deleting, when the execution is completed for all the tasks using the decided data, the decided data stored in a memory accessible by the accelerator by processing executed by the tasks.

In another aspect that achieves the object, an accelerator control method according to one aspect of the present invention includes by an information processing device: deciding, in processing flow information representing a flow that tasks generated by a program executed by an accelerator process data being inputted to the tasks and outputted from the tasks, temporary data temporarily generated during execution of the program from among the data; determining, based on an execution status of the task by the accelerator and the processing flow information, whether or not execution is completed for all the tasks using decided data decided from among the temporary data; and deleting, when the execution is completed for all the tasks using the decided data, the decided data stored in a memory accessible by the accelerator by processing executed by the tasks.

Further, in further another aspect that achieves the object, an accelerator control program according to one aspect of the present invention causes a computer to execute: decision processing of deciding, in processing flow information representing a flow that tasks generated by a program executed by an accelerator process data being inputted to the tasks and outputted from the tasks, temporary data temporarily generated during execution of the program from among the data; determination processing of determining, based on an execution status of the tasks by the accelerator and the processing flow information, whether or not execution is completed for all the tasks using decide data decided from among the temporary data; and deletion processing of deleting, when the execution is completed for all the tasks using the decided data, the decided data stored in a memory accessible by the accelerator by processing executed by the tasks.

Further, the present invention can be achieved on the basis of a non-transitory computer readable recording medium storing the accelerator control program (computer program).

Advantageous Effects of Invention

The present invention is able to avoid degradation of processing performance based on an accelerator when a size of data to be processed by the accelerator is large.

BRIEF DESCRIPTION OF DRAWINGS

FIG. 6 is a diagram exemplarily illustrating a configuration of metadata 153 generated, on the basis of the DAG 152A exemplarily illustrated in FIG. 5, by the decision unit 11 according to the first example embodiment of the present invention.

FIG. 8 is a diagram exemplarily illustrating a configuration of metadata 153 generated, on the basis of the DAG 153B exemplarily illustrated in FIG. 7, by the decision unit 11 according to the first example embodiment of the present invention.

FIG. 11 is a block diagram illustrating a configuration of an information processing device 900 capable of running the accelerator control device 10 and the accelerator control device 30 according to example embodiments of the present invention.

EXAMPLE EMBODIMENT

Hereinafter, example embodiments of the present invention are described in detail with reference to the accompanying drawings.

First Example Embodiment

Figure 1:
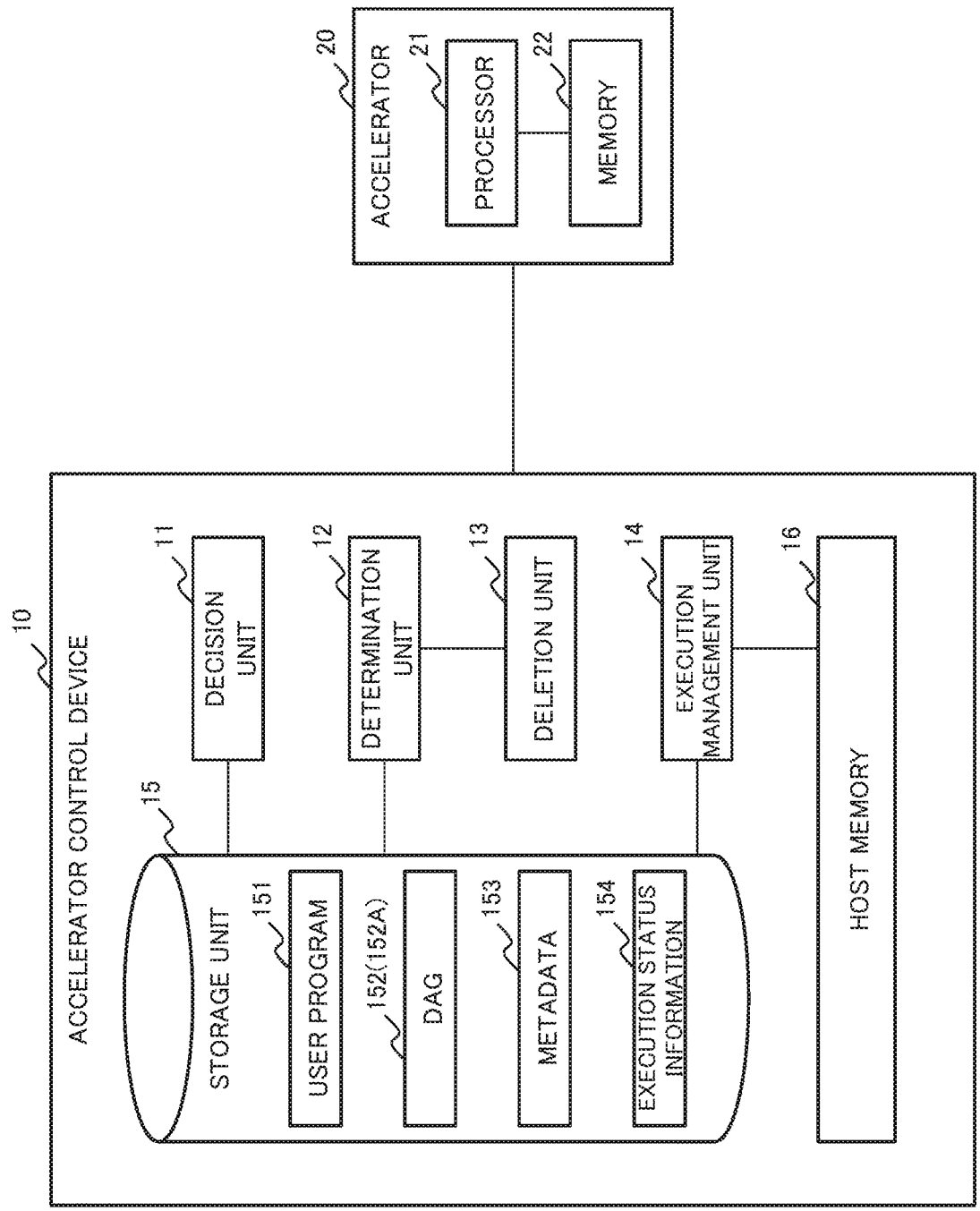
FIG. 1 is a block diagram illustrating a configuration of an accelerator control device 10 according to a first example embodiment of the present invention.

FIG. 1 is a block diagram conceptually illustrating a configuration of an accelerator control device 10 according to a first example embodiment of the present invention. The accelerator control device 10 is a device (host computer) that is communicably connected to an accelerator 20 and controls the accelerator 20 in such a way as to execute specific information processing (e.g. image processing and the like).

The accelerator 20 is, for example, a GPU and the like and is a device including a configuration (e.g. a configuration including a large number of arithmetic cores) capable of executing specific information processing such as image processing at high speed. The accelerator 20 includes a processor 21 and a memory 22. The memory 22 may be a memory that is accessible from the processor 21 and exists outside of the accelerator 20. The processor 21 executes processing for a program and data received by the accelerator 20 from the accelerator control device 10 and stored in the memory 22. The accelerator 20 transmits the processing result to the accelerator control device 10.

The accelerator control device 10 includes a decision unit 11, a determination unit 12, a deletion unit 13, an execution management unit 14, a storage unit 15, and a host memory 16.

The host memory 16 is, for example, a main storage in the accelerator control device 10 and stores data to be processed by the accelerator control device 10 and the like. The host memory 16 stores data transmitted/received to/from the accelerator 20 by the accelerator control device 10.

The storage unit 15 is a storage device such as a magnetic disk or an electronic memory. The storage unit 15 stores a user program 151, a directed acyclic graph (DAG) 152, metadata 153, and execution status information 154.

Figures 2, 3:
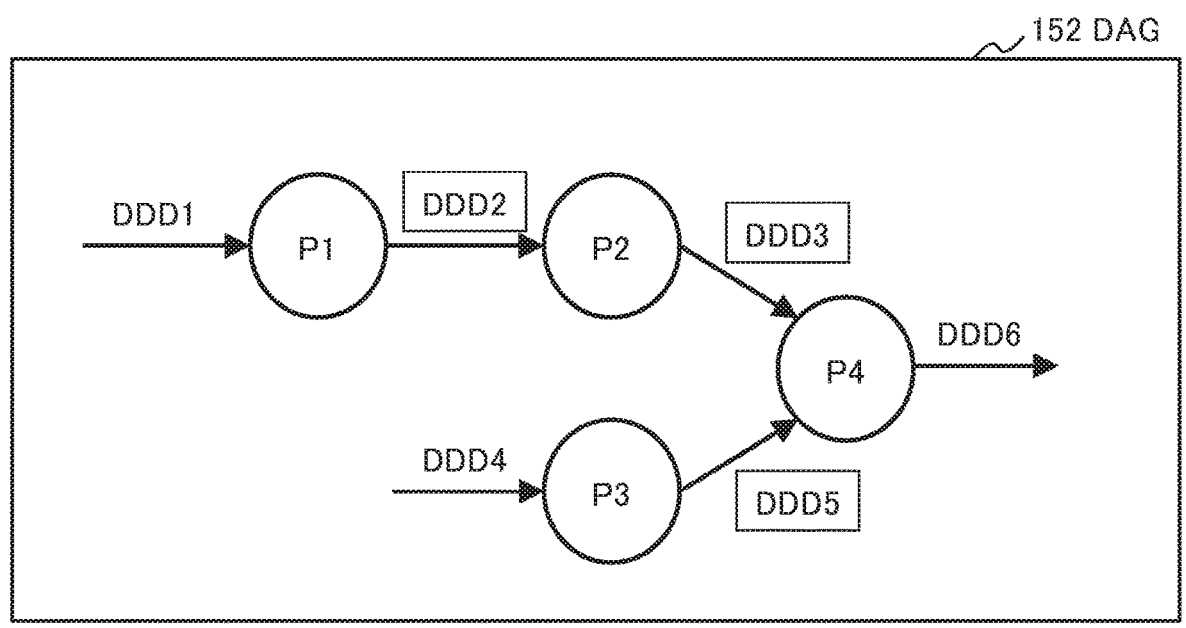
FIG. 2 is a diagram illustrating one example of a user program 151 according to the first example embodiment of the present invention.
FIG. 3 is a diagram illustrating one example of a DAG 152 according to the first example embodiment of the present invention.

The user program 151 is a program which the accelerator control device 10 causes the accelerator 20 to execute. The user program 151 is a program, provided as a user library by the decision unit 11 to be described later, using an application programming interface (API) for causing the accelerator 20 to be able to execute data processing. FIG. 2 is a diagram illustrating one example of a user program 151 according to the present example embodiment.

The first and second lines in the user program 151 represent that an object read from an outside is instantiated (data as an actual value are generated) and thereby data to be input to the accelerator 20 as a processing target are generated. DDD1 in the first line represents data in which a file (object) assigned with a name of "inputFilePath1" and stored in a file system included in the accelerator control device 10 is read and the read file is instantiated. Similarly, DDD4 in the second line represents data in which a file assigned with a name of "inputFilePath4" is read and the read file is instantiated.

The third line in the user program 151 represents that processing (tasks) P1 and P2 specified by a user for DDD1 are sequentially executed and as a result, DDD3 is generated. A "TempDDD" in the third line represents that a user declares (explicitly indicates) that data to be targeted are transitory data. In other words, the third line in the user program 151 represents that DDD3 represents transitory data (hereinafter, in the present invention, referred to as temporary data or a temporary DDD). Herein, temporary data (a temporary DDD) indicate data that are not used except for processing indicated by the user program 151.

"Map" processing described in the third line in the user program 151 is an API provided as a user library and represents that the same processing is executed for all data elements included in a DDD (data). In other words, in the first "map processing" in the third line, processing P1 specified by a user is executed for all data elements included in DDD1. In the second "map" processing in the third line, processing P2 is executed for all data elements included in a DDD generated by executing processing P1. As a result of execution of processing P2, DDD3 being a temporary DDD is generated.

The fourth line in the user program 151 represents that "map" processing is executed for DDD4. In other words, the fourth line represents that processing P3 specified by a user is executed for all data elements included in DDD4 and as a result, DDD5 being a temporary DDD is generated.

"Zip" processing described in the fifth line in the user program 151 is an API provided as a user library and represents that two DDDs are associated with each other. In other words, in "zip" processing in the fifth line, DDD3 and DDD5 are associated with each other.

The sixth line in the user program 151 represents that "map" processing that executes processing P4 for DDD3 is executed. In the user program 151, in the fifth line, since DDD3 and DDD5 are associated with each other, processing P4 is executed for all combinations of associated data elements included in DDD3 and DDD5 and as a result, DDD6 is generated.

"OutputFile" processing described in the seventh line in the user program 151 is an API provided as a user library and represents that a DDD is file-output. In other words, the seventh line represents that as a processing result, DDD6 is file-output to a file system in the accelerator control device 10 under a file name referred to as "outputFilePath".

The decision unit 11 illustrated in FIG. 11 generates, on the basis of the user program 151, a DAG 152 that is processing flow information representing a relation between processing (a task) generated by the user program 151 and data being inputted to a task and outputted from a task. FIG. 3 is a diagram conceptually illustrating one example of a DAG 152 generated by the decision unit 11 on the basis of the user program 151 exemplarily illustrated in FIG. 2.

The decision unit 11 generates a node (processing, a task) every time an API provided as a user library including "map" processing and the like is called from the user program 151. The decision unit 11 requests, when "outputFile" processing is called from the user program 151, the execution management unit 14, to be described later, to execute a DAG 152 generated so far.

In the DAG 152 exemplarily illustrated in FIG. 3, data to be processed by the accelerator 20 illustrated in FIG. 1 are indicated as a DDD and are represented by an edge (an arrow line illustrated in FIG. 3) in the DAG 152. Further, processing (a task) executed for data is represented by a node (a circle illustrated in FIG. 3) in the DAG 152. In the DAG 152, a number assigned to a DDD representing data and a number assigned to P representing processing each are based on a variable name in the user program 151 exemplarily illustrated in FIG. 2.

A direction of an edge in the DAG 152 exemplarily illustrated in FIG. 3 indicates dependency of processing. For example, P2 is processing executed for DDD2 being an output of P1, and P2 cannot be executed until execution of P1 is completed. Note that DDD2 in FIG. 3 is not described in the user program 151 exemplarily illustrated in FIG. 2. DDD2 is generated as a result of application of a map (P1) to DDD1 and represents data before applying a map (P2). According to the present example embodiment, it is assumed that with respect to each processing applied to data to be processed, one task and a DDD being data generated as the processing result are defined.

The decision unit 11 decides a DDD being a temporary DDD from among DDD1 to DDD6 included in a DAG 152. The decision unit 11 decides, as a temporary DDD, DDD3 and DDD5 each being a DDD explicitly indicated by a user as a "TempDDD" in the user program 151 exemplarily illustrated in FIG. 2. The decision unit 11 further decides, as a temporary DDD, DDD2 being a DDD not described in the user program 151 exemplarily illustrated in FIG. 2. This is based on a fact that a DDD (not defined, for example, by an equal sign "=") that is not described in the user program 151 is not reused in the user program 151. Note that, in FIG. 3 (and also FIGS. 4, 5, and 7), a DDD (i.e. DDD2, DDD3, and DDD5) illustrated by being framed is a temporary DDD.

The decision unit 11 further analyzes a DAG 152 by using a technique described in, for example, NPL 1, and thereby divides a task into subtasks and divides data DDD into partial data being inputted to a subtask and outputted from a subtask. Note that, in the present invention, hereinafter, it is assumed that partial data are referred to as a data partition DP.

Figure 4:
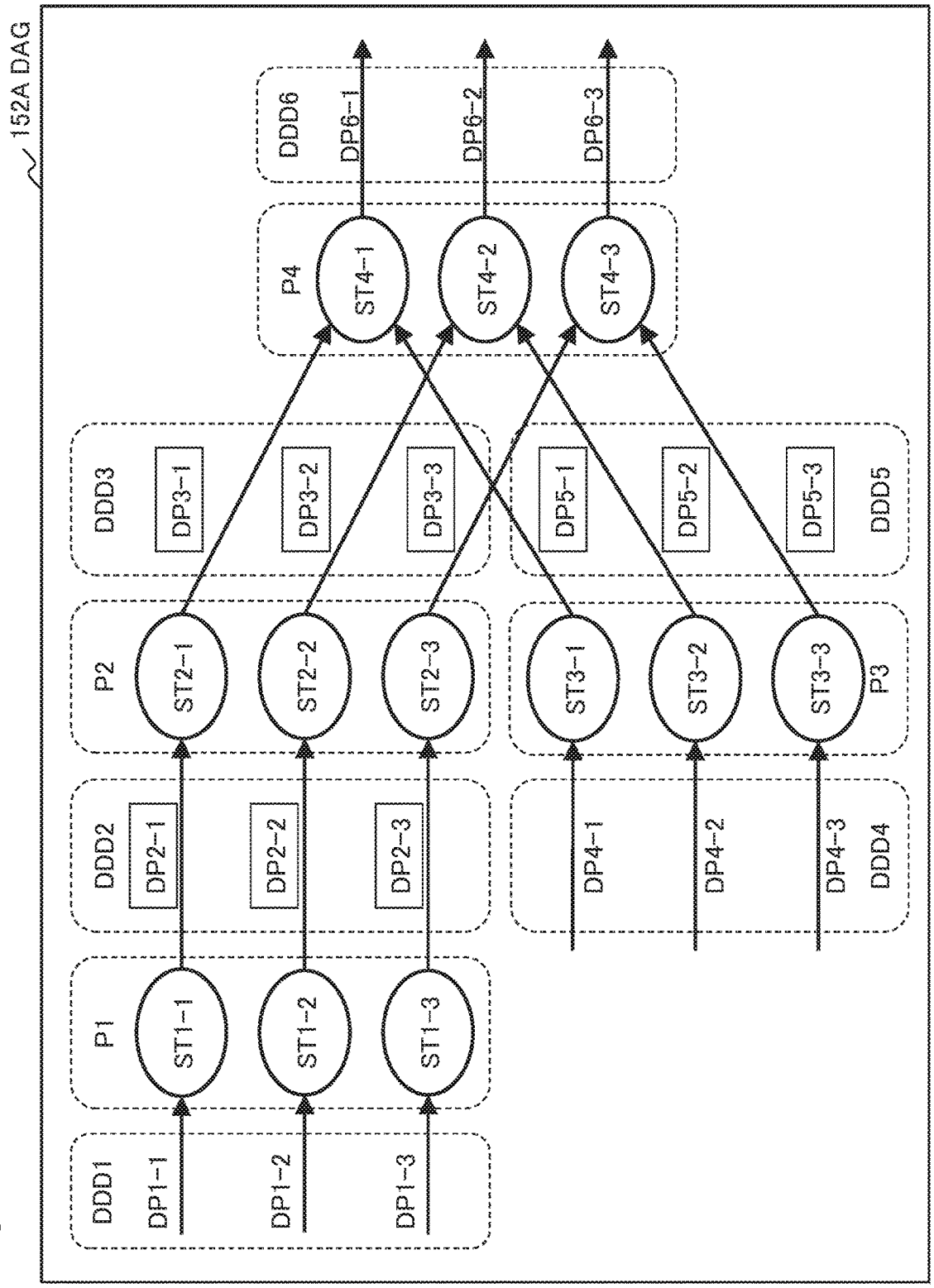
FIG. 4 is a diagram illustrating one example of a DAG 152A generated after a decision unit 11 according to the first example embodiment of the present invention divides a task into three parts.

FIG. 4 is a diagram conceptually illustrating one example of a DAG 152A generated by the decision unit 11 by dividing processing P and data DDD included in a DAG 152. In the example illustrated in FIG. 4, the decision unit 11 divides processing P and data DDD included in the DAG 152 into three parts each. In other words, the decision unit 11 divides processing P1 into subtasks ST1-1 to ST1-3, divides processing P2 into subtasks ST2-1 to ST2-3, divides processing P3 into subtasks ST3-1 to ST3-3, and divides processing P4 into subtasks ST4-1 to ST4-3.

The decision unit 11 further divides data DDD1 into DP1-1 to DP1-3, divides data DDD2 into DP2-1 to DP2-3, divides data DDD3 into DP3-1 to DP3-3, divides data DDD4 into DP4-1 to DP4-3, divides data DDD5 into DP5-1 to DP5-3, and divides data DDD6 into DP6-1 to DP6-3. In this manner, the decision unit 11 divides processing and data in the DAG 152 exemplarily illustrated in FIG. 3 into three systems of processing and data as exemplarily illustrated in FIG. 4.

The decision unit 11 decides a DP being temporary data from among DPs included in the DAG 152A. In this case, the decision unit 11 decides, as temporary data, DP2-1 to DP2-3, DP3-1 to DP3-3, and DP5-1 to DP5-3 generated by dividing DDD2, DDD3, and DDD5 decided as a temporary DDD.

Figure 5:
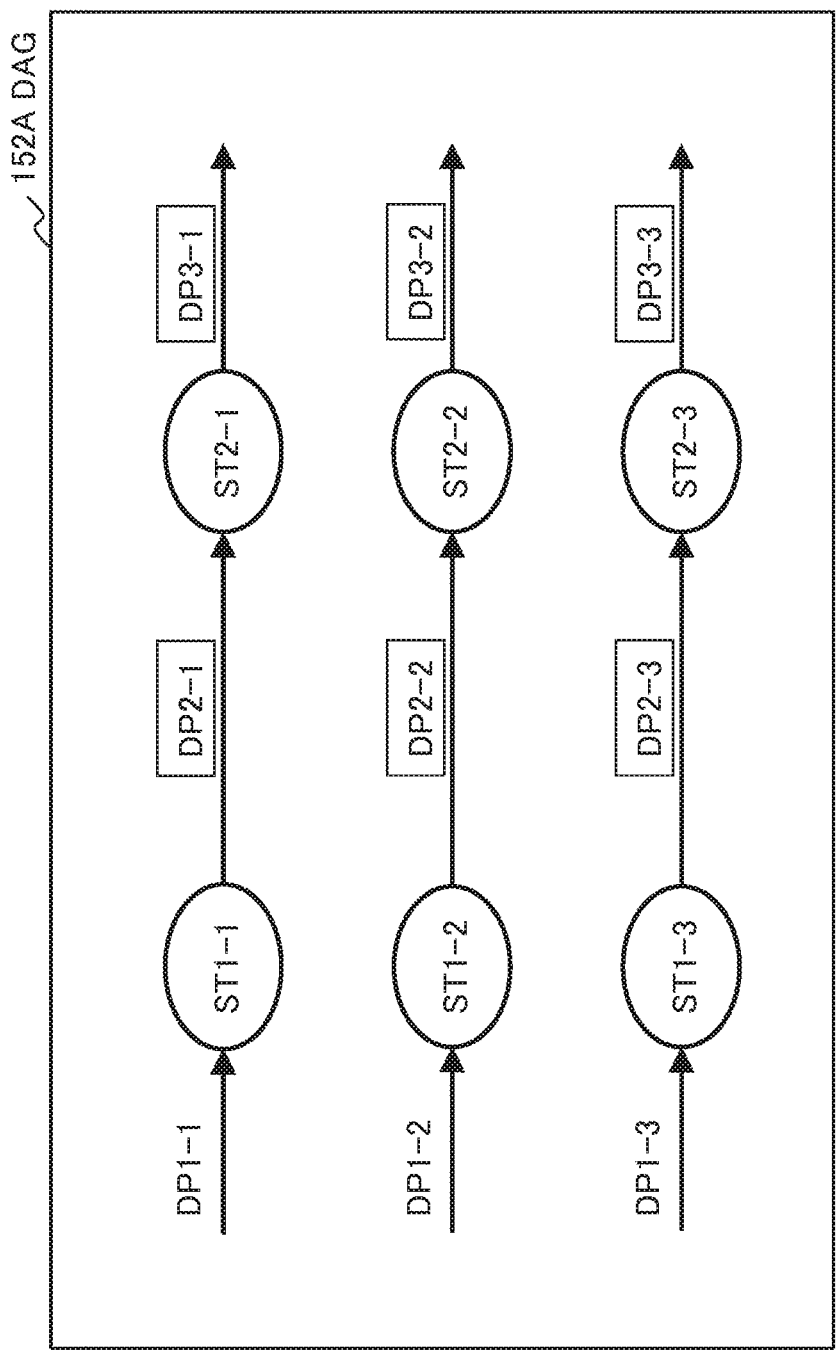
FIG. 5 is a diagram in which a part of the DAG 152A illustrated in FIG. 4 is extracted.

The decision unit 11 generates metadata 153 representing a feature of each data partition DP indicated by a DAG 152A and stores the generated metadata 153 in the storage unit 15. FIG. 5 is a diagram in which a part of a DAG 152A exemplarily illustrated in FIG. 4 is extracted. FIG. 6 is a diagram exemplarily illustrating a configuration of metadata 153 generated by the decision unit 11 on the basis of the DAG 152A exemplarily illustrated in FIG. 5. In the metadata 153, a "DP size", a "temporary flag", and a "subtask using a DP" are associated for each DP.

A "DP size" in metadata 153 is a value representing a size of a DP generated by the decision unit 11 by dividing each DDD and is 128 megabytes (MB) with respect to each DP in the example illustrated in FIG. 6. A "temporary flag" in metadata 153 is a flag (identifier) indicating "1" when a DP represents temporary data, and as illustrated in FIG. 5, a value for DP2-1 to DP 2-3 is "1". A "subtask using a DP" is information discriminating a subtask using the DP, and subtasks using DP2-1 to DP2-3 are ST2-1 to ST2-3 in this order.

Figure 7:
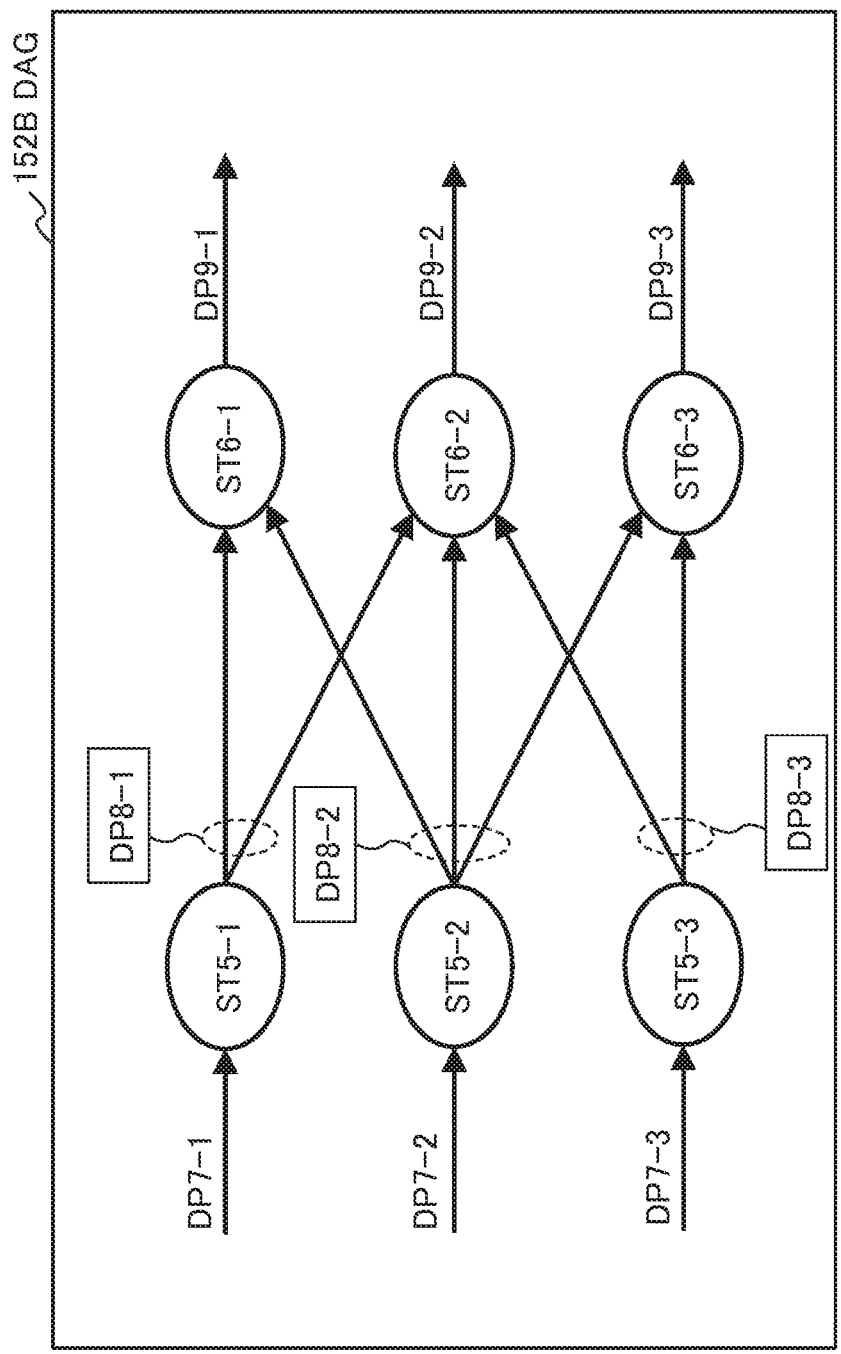
FIG. 7 is a diagram exemplarily illustrating a DAG 152B different from a DAG 152A in a relation between a subtask and a data partition.

FIG. 7 is a diagram exemplarily illustrating a DAG 152B different from a DAG 152A in an input/output relation with respect to a subtask and a data partition DP. FIG. 8 is a diagram exemplarily illustrating a configuration of metadata 153 generated by the decision unit 11 on the basis of the DAG 152B exemplarily illustrated in FIG. 7.

In the DAG 152B exemplarily illustrated in FIG. 7, DP8-1 output from a subtask ST5-1 is input to ST6-1 and ST6-2, DP8-2 output from a subtask ST5-2 is input to ST6-1 to ST6-3, and DP8-3 output from a subtask ST5-3 is input to ST6-2 and ST6-3. Therefore, in this case, the decision unit 11 generates metadata 153 representing the above-described input/output relation with respect to a subtask and a DP, as exemplarily illustrated in FIG. 8.

The execution management unit 14 illustrated in FIG. 1 controls the accelerator 20 in such a way as to receive a request from the decision unit 11 and execute a user program 151 (i.e., processing indicated by a DAG 152A). At that time, the execution management unit 14 determines an order in which a subtask included in a DAG 152A stored in the storage unit 15 is executed by the accelerator 20. The execution management unit 14 selects a subtask to be executed next by the accelerator 20 from among subtasks executable among subtasks included in the DAG 152A. Herein, an executable subtask is a subtask located, at an execution start time of the user program 151, in an uppermost stream in a flow of processing of the DAG 152A. After execution of the user program 151 is started, an executable subtask is a subtask that is located in an upstream from the subtask and is in a state where execution of a subtask for inputting a DP to the subtask is thoroughly completed. The execution management unit 14 manages whether or not execution of each subtask is completed, by updating execution status information 154 stored in the storage unit 15.

The execution management unit 14 confirms a usage rate of the memory 22 in the accelerator 20 before causing the accelerator 20 to execute a selected subtask. The execution management unit 14 evacuates, when a usage rate (memory usage rate) of the memory 22 is equal to or larger than a threshold, any one of DPs, stored in the memory 22, having been used by a preceding subtask to the host memory 16 in order to reduce the memory usage rate. The execution management unit 14 can use, as a criterion for selecting a DP to be evacuated to the host memory 16, a policy such as a least recently used (LRU) policy for selecting a DP having not been recently referred to and the like. The execution management unit 14 repeatedly executes such operation of evacuating a DP from the memory 22 to the host memory 16 until a usage rate of the memory 22 is less than a threshold.

The execution management unit 14 ensures, when a DP used by a subtask to be executed next by the accelerator 20 does not exist on the memory 22, a memory area capable of storing the DP on the memory 22, for example, on the basis of a DP size indicated by metadata 153, after a usage rate of the memory 22 is less that a threshold. The execution management unit 14 loads, on the memory 22, a DP included in a file stored in the storage unit 15 of the accelerator control device 10 or a DP evacuated to the host memory 16 as a DP to be used by the subtask. The execution management unit 14 may not necessarily execute the above-described operation of preparing a DP to be used by a subtask executed next by the accelerator 20 when a DP to be used by a subtask executed next by the accelerator 20 exists on the memory 22.

The execution management unit 14 causes, after preparing a DP to be used by a subtask executed next by the accelerator 20, the accelerator 20 to execute the subtask. The execution management unit 14 updates, when execution of a subtask by the accelerator 20 is completed, the execution status information 154 stored in the storage unit 15.

The determination unit 12 illustrated in FIG. 1 determines, on the basis of execution status information 154 representing execution information of a subtask based on the accelerator 20 and a DAG 152A (or metadata 153), whether or not with regard to a DP decided as temporary data, execution of all subtasks using the DP is completed.

An operation executed by the determination unit 12 is described in detail with reference to FIGS. 5 to 8. When the accelerator 20 executes processing indicated by the DAG 152A exemplarily illustrated in FIG. 5, a subtask in which, for example, DP2-1 being temporary data is an input is only ST2-1 as illustrated in FIGS. 5 and 6. Therefore, in this case, the determination unit 12 determines, when execution of the subtask ST2-1 by the accelerator 20 is completed, that execution of all subtasks using DP2-1 being temporary data is completed.

Further, when the accelerator 20 executes processing indicated by the DAG 152B exemplarily illustrated in FIG. 7, a subtask in which, for example, DP8-2 being temporary data is an input includes ST6-1 to ST6-3, as illustrated in FIGS. 7 and 8. Therefore, in this case, the determination unit 12 determines, when execution of the subtasks ST6-1 to ST6-3 by the accelerator 20 is thoroughly completed, that execution of all subtasks using DP8-2 being temporary data is completed.

The deletion unit 13 illustrated in FIG. 1 deletes, when the determination unit 12 determines that execution of all subtasks using a DP being temporary data is completed, the DP from the memory 22 in the accelerator 20. In other words, the deletion unit 13 deletes, when the accelerator 20 executes processing indicated by the DAG 152A exemplarily illustrated in FIG. 5, DP2-1 being temporary data when execution of a subtask ST2-1 by the accelerator 20 is completed. Alternatively, the deletion unit 13 deletes, when the accelerator 20 executes processing indicated by the DAG 152B exemplarily illustrated in FIG. 7, DP8-2 being temporary data when execution of ST6-1 to ST6-3 by the accelerator 20 is thoroughly completed.

Figure 9A:
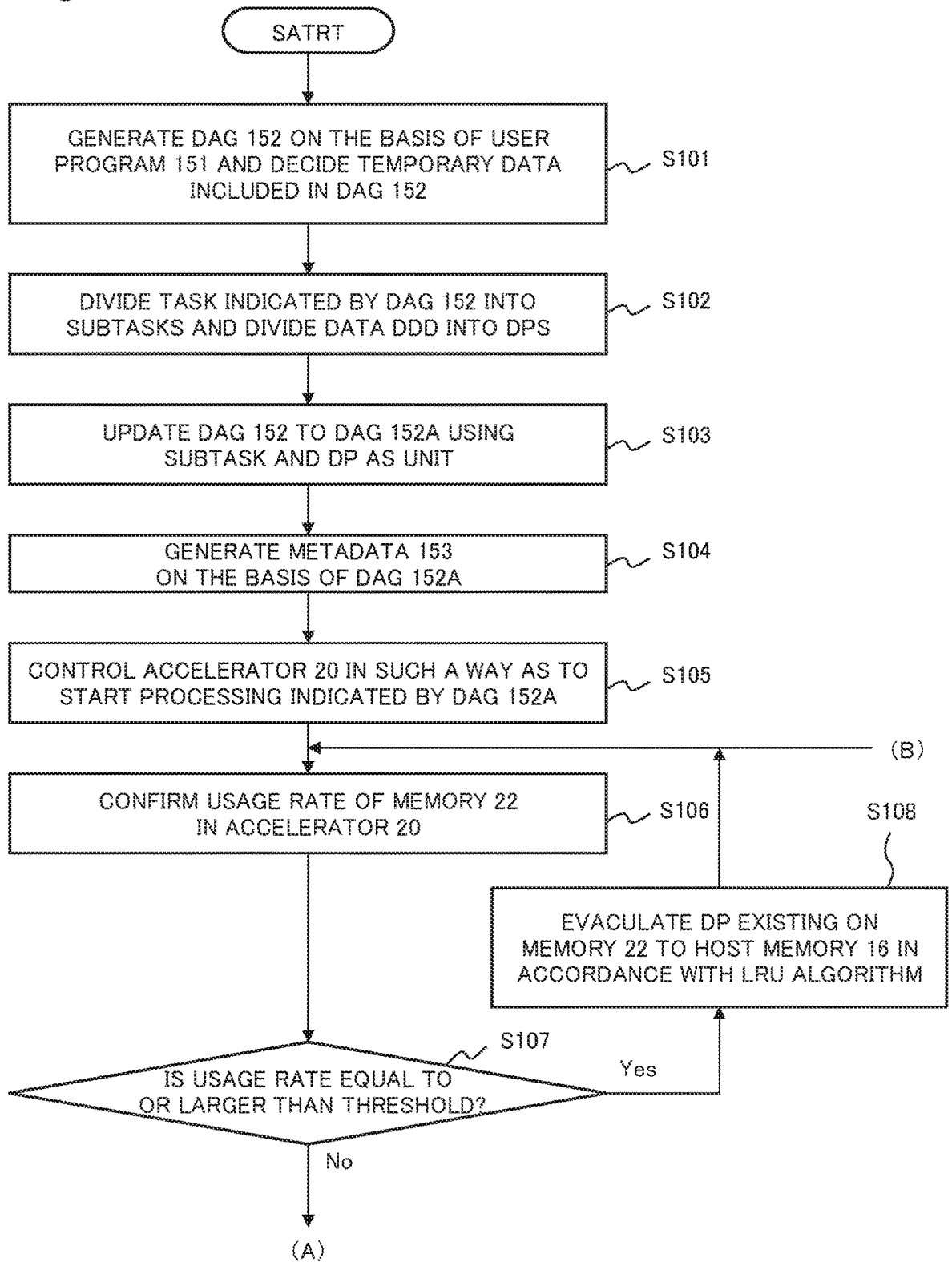
FIG. 9A is a flowchart (1/2) illustrating an operation of the accelerator control device 10 according to the first example embodiment of the present invention.
Figure 9B:
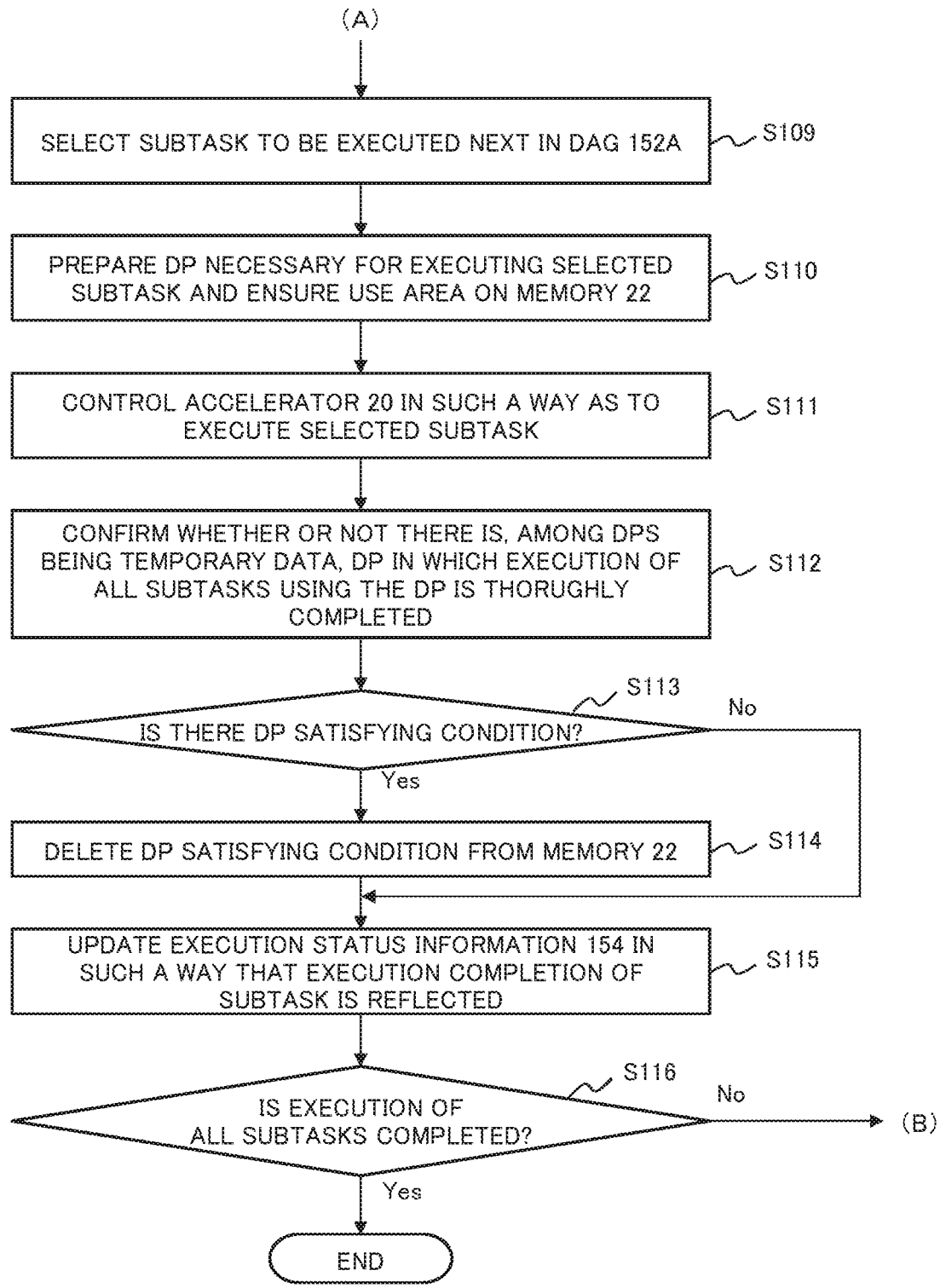
FIG. 9B is a flowchart (2/2) illustrating an operation of the accelerator control device 10 according to the first example embodiment of the present invention.

Next, with reference to a flowchart of FIGS. 9A and 9B, an operation (processing) of the accelerator control device 10 according to the present example embodiment is described in detail.

The decision unit 11 generates a DAG 152 on the basis of a user program 151 and decides temporary data included in the DAG 152 (step S101). The decision unit 11 divides a task indicated by the DAG 152 into subtasks and divides data DDD into DPs (step S102). The decision unit 11 updates the DAG 152 to a DAG 152A having a subtask and a DP as a unit (step S103). The decision unit 11 generates metadata 153 on the basis of the DAG 152A and stores the generated metadata 153 in the storage unit 15 (step S104).

The execution management unit 14 controls the accelerator 20 in such a way as to start processing indicated by the DAG 152A (step S105). The execution management unit 14 confirms a usage rate of the memory 22 in the accelerator 20 (step S106).

When a usage rate of the memory 22 is equal to or larger than a threshold (Yes in step S107), the execution management unit 14 evacuates a DP existing on the memory 22 to the host memory 16, for example, in accordance with an LRU algorithm (step S108), and processing returns to step S106. When a usage rate of the memory 22 is less than the threshold (No in step S107), the execution management unit 14 refers to execution status information 154 and thereby selects a subtask to be executed next in the DAG 152A (step S109).

The execution management unit 14 prepares a DP necessary for executing the selected subtask and ensures a use area on the memory 22 (step S110). The execution management unit 14 controls the accelerator 20 in such a way as to execute the selected subtask (step S111).

The determination unit 12 confirms whether or not among DPs being temporary data, there is a DP in which execution of all subtasks using the DP is completed (step S112). When there is no DP satisfying the condition indicated in step S112 (No in step S113), processing moves to step S115. When there is a DP satisfying the condition indicated in step S112 (Yes in step S113), the deletion unit 13 deletes a DP satisfying the condition from the memory 22 (step S114).

The execution management unit 14 updates the execution status information 154 in such a way that execution completion of a subtask is reflected (step S115). When there is a subtask unexecuted among subtasks included in the DAG 152A (No in step S116), processing returns to step S106. When execution of all subtasks included in the DAG 152A is completed (Yes in step S116), the entire processing is terminated.

The accelerator control device 10 according to the present example embodiment can avoid, when a size of data to be processed by an accelerator is large, degradation of processing performance based on the accelerator. The reason is that the accelerator control device 10 deletes temporary data stored in the memory 22 included in the accelerator 20 according to a fact that processing (a task) using the temporary data does not exist (e.g. at a time of no existence).

Hereinafter, advantageous effects achieved by the accelerator control device 10 according to the present example embodiment are described in detail.

A case where a size of data to be processed by an accelerator is larger than a memory capacity included in the accelerator has frequently occurred. In processing ("out-of-core processing") for data large than a memory capacity, there is a problem in that processing performance based on an accelerator degrades. In other words, in out-of-core processing, an accelerator needs to proceed processing while evacuating data stored in a memory included in the accelerator, for example, to a memory of a host computer. In this case, a bandwidth of an I/O path connecting the accelerator and the host computer is narrow, and therefore processing performance based on the accelerator may largely degrade.

For such a problem, the accelerator control device 10 according to the present example embodiment includes a decision unit 11, a determination unit 12, and a deletion unit 13 and operates as described above, for example, with reference to FIG. 1 to FIG. 9B. In other words, the decision unit 11 decides, in a DAG 152 representing a flow that tasks generated by a user program 151 executed by the accelerator 20 process data being inputted to the tasks and outputted from the tasks, temporary data temporarily generated during execution of the user program 151 among the data. The determination unit 12 determines whether or not execution is completed for all tasks using data decided from among temporary data, on the basis of execution status information 154 relating to a task based on the accelerator 20 and a DAG 152. The deletion unit 13 deletes, when execution for all tasks using decided data is completed, the decided data stored in the memory 22 accessible by the accelerator 20 by processing based on a task.

In other words, a problem does not occur even when among data included in a DAG 152 (DAG 152A), temporary data are deleted from the memory 22 in the accelerator 20 when all tasks (subtasks) using the temporary data are completed. The accelerator control device 10 according to the present example embodiment decides temporary data included in a DAG 152 and deletes, when all tasks using the decided temporary data are completed, the temporary data from the memory 22. Thereby, the accelerator control device 10 is able to reduce a frequency where processing of evacuating data, being a factor of performance degradation in the above-described out-of-core processing, from the memory 22 to the host memory 16. Therefore, the accelerator control device 10 according to the present example embodiment is able to avoid degradation of processing performance based on an accelerator when a size of data to be processed by the accelerator is large.

Further, the accelerator control device 10 according to the present example embodiment analyzes a DAG 152, and thereby divides tasks into subtasks and divides data into partial data (DPs) being inputted to the subtasks and outputted from the subtasks. Then, the accelerator control device 10 generates a DAG 152A having a subtask and a DP as a unit and executes the above-described processing by using a subtask and a DP as a unit. Thereby, the accelerator control device 10 is able to control the accelerator 20 in such a way as to be able to execute processing even for a large-scale program and large-scale data.

Further, the accelerator control device 10 according to the present example embodiment decides data as temporary data when data are declared as temporary data in a user program 151 or when no description of data exists (data are not defined, for example, by an equal sign "="). Thereby, the accelerator control device 10 according to the present example embodiment is able to reliably decide temporary data.

Further, the accelerator control device 10 according to the present example embodiment controls, when a usage rate of a memory included in the accelerator 20 is equal to or larger than a threshold, the accelerator 20, for example, in accordance with an LRU algorithm in such a way as to evacuate data (a DP) stored in the memory included in the accelerator 20 to a local device until the usage rate is less than the threshold. Thereby, the accelerator control device 10 according to the present example embodiment is able to avoid occurrence of memory shortage and the like in the accelerator 20 and therefore can reliably proceed processing by the accelerator 20.

Note that, while the accelerator control device 10 according to the present example embodiment uses a directed acyclic graph (DAG) as processing flow information representing a relation between tasks generated by a user program 151 and data being inputted to the tasks and outputted from the tasks, processing flow information to be used is not limited to a DAG. The accelerator control device 10 may use processing flow information of a format (specification) different from a DAG.

Further, according to the above-described present example embodiment, a DAG 152 is generated by the decision unit 11, but a DAG 152 may be provided to the accelerator control device 10 from an outside.

Second Example Embodiment

Figure 10:
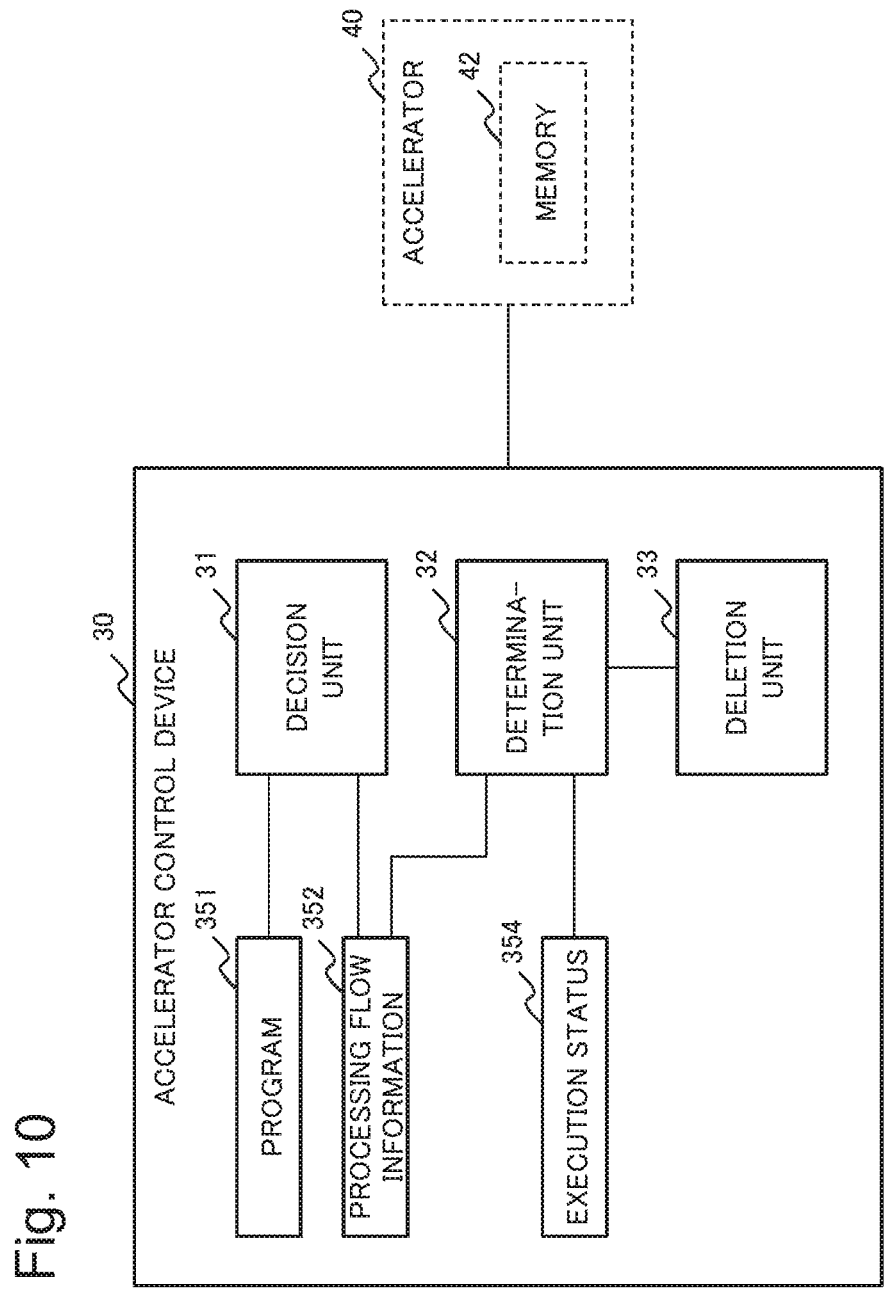
FIG. 10 is a block diagram illustrating a configuration of an accelerator control device 30 according to a second example embodiment of the present invention.

FIG. 10 is a block diagram conceptually illustrating a configuration of an accelerator control device 30 according to a second example embodiment of the present invention.

The accelerator control device 30 according to the present example embodiment includes a decision unit 31, a determination unit 32, and a deletion unit 33.

The decision unit 31 decides, in processing flow information 352 representing a flow that tasks generated by a program 351 executed by an accelerator 40 process data being inputted to the tasks and outputted from the tasks, temporary data temporarily generated during execution of the program 351 among the data.

The determination unit 32 determines, on the basis of an execution status 354 of a task based on the accelerator 40 and processing flow information 352, whether or not execution is completed for all tasks using data decided from among temporary data.

The deletion unit 33 deletes, when execution is completed for all tasks using decided data, the decided data stored in a memory 42 accessible by the accelerator 40 by processing based on a task.

The accelerator control device 30 according to the present example embodiment is able to avoid degradation of processing performance based on an accelerator when a size of data to be processed by the accelerator is large. The reason is that the accelerator control device 30 deletes temporary data stored in the memory 42 accessible by the accelerator 40 according to a fact that processing (a task) using the temporary data does not exist (e.g. at a time of no existence).

<Hardware Configuration Example>

In the example embodiments described above, units in the accelerator control device 10 illustrated in FIG. 1 and the accelerator control device 30 illustrated in FIG. 10 can be achieved by dedicated hardware (HW) (an electronic circuit). Further, in FIGS. 1 and 10, at least the following configuration is conceivable as a function (processing) unit (software module) of a software program.

Decision units 11 and 31,
determination units 12 and 32,
deletion units 13 and 33,
execution management unit 14, and
storage control function in the storage unit 15.

However, division of units illustrated in these drawings is a configuration from a point of view of description convenience, and in implementation, various configurations are assumable. One example of a hardware environment in this case is described with reference to FIG. 11.

FIG. 11 is a block diagram exemplarily illustrating a configuration of an information processing device 900 (computer) capable of running the accelerator control device 10 and the accelerator control device 30 according to the example embodiments of the present invention. In other words, FIG. 11 is a configuration of a computer (information processing device) capable of achieving the accelerator control device 10 and the accelerator control device 30 illustrated in FIG. 1 and FIG. 10 or a part thereof and represents a hardware environment capable of achieving functions according to the example embodiments described above. The information processing device 900 illustrated in FIG. 11 includes the following as components.

A central processing unit (CPU) 901,
a read only memory (ROM) 902,
a random access memory (RAM) 903,
hard disk (storage device) 904,
a communication interface 905 with an external device such as a radio transmission/reception unit and the like,
a bus 906 (communication line),
a reader/writer 908 capable of executing reading/writing for data stored in a recording medium 907 such as a compact disc read only memory (CD-ROM), and
an input/output interface 909.

In other words, the information processing device 900 including the components is a general computer in which these components are connected via the bus 906. The information processing device 900 may include a plurality of CPUs 901 or may include a CPU 901 including a multicore. Alternatively, the information processing device 900 may include a configuration in which a general-purpose CPU as a main and a hardware accelerator specializing in specific arithmetic processing cooperate in such a way that a plurality of pieces of processing can be executed in parallel.

The present invention described by using the example embodiments described above as examples supplies a computer program capable of achieving the following function to the information processing device 900 illustrated in FIG. 11. The function is a function of the above-described configuration in a block configuration diagram (FIGS. 1 and 10) referred to in description of the example embodiments or a function of a flowchart (FIGS. 9A and 9B). The present invention is achieved by reading the computer program into the CPU 901 of the hardware and interpreting and executing the read computer program. Further, a computer program supplied into the device may be stored in a readable/writable transitory memory (RAM 903) or a non-transitory storage device such as the ROM 902, and the hard disk 904.

Further, in the case, a supply method of a computer program into the hardware can employ a currently general procedure. The procedure includes, for example, a method of installation into the device via various recording media 907 such as a CD-ROM, a method of downloading from an outside via a communication line such as the Internet, and the like. In such a case, it is conceivable that the present invention includes a code configuring the computer program or a recording medium 907 storing the code.

The present invention has been described as using the above-described example embodiments as exemplary cases. However, the present invention is not limited to the above-described example embodiments. In other words, the present invention can be applied with various aspects that can be understood by those skilled in the art without departing from the scope of the present invention.

This application is based upon and claims the benefit of priority from Japanese patent application No. 2017-115862, filed on Jun. 13, 2017, the disclosure of which is incorporated herein in its entirety by reference.

REFERENCE SIGNS LIST

10 Accelerator control device
11 Decision unit
12 Determination unit
13 Deletion unit
14 Execution management unit
15 Storage unit
151 User program
152 DAG
152A DAG
152B DAG
153 Metadata
154 Execution status information
16 Host memory
20 Accelerator
21 Processor
22 Memory
30 Accelerator control device
31 Decision unit 32 Determination unit
33 Deletion unit
351 Program
352 Processing flow information
354 Execution status
40 Accelerator
42 Memory
900 Information processing device
901 CPU
902 ROM
903 RAM
904 Hard disk (storage device)
905 Communication interface
906 Bus
907 Recording medium
908 Reader/writer
909 Input/output interface

The invention claimed is:

1. An accelerator control device comprising:
a storage for storing metadata representing a feature of the partial data;
at least one memory storing a computer program; and
at least one processor configured to execute the computer program to:
decide, in processing flow information representing a flow that tasks generated by a program executed by an accelerator process data being inputted to the tasks and outputted from the tasks, temporary data temporarily generated during execution of the program from among the data;
determine, based on an execution status of the tasks by the accelerator and the processing flow information, whether or not execution is completed for all the tasks using decided data decided from among the temporary data;
delete, when the execution is completed for all the tasks using the decided data, the decided data stored in a memory accessible by the accelerator by processing executed by the tasks;
divide the tasks into subtasks by analyzing the processing flow information, divide the data into partial data being inputted to the subtasks and outputted from the subtasks, then generate the processing flow information including the subtasks and the partial data, and decide the temporary data from among the partial data;
determine whether or not execution is completed for all the subtasks using decided partial data decided from among the temporary data;
delete, when the execution is completed for all the subtasks using the decided partial data, the decided partial data stored in the memory by processing executed by the subtasks;
generate the metadata by associating the partial data, an identifier indicating that the partial data are the temporary data, the subtasks using the partial data, and a size of the partial data, and store the metadata being generated in the storage;
ensure, when the accelerator is controlled in such a way as to execute the subtasks in order, based on an execution status of the subtasks by the accelerator and the processing flow information, a use area for the subtasks in the memory, based on a size of the partial data used by the subtasks indicated by the metadata; and
control, when a usage rate of the memory is equal to or larger than a threshold, the accelerator in such a way as to evacuate the partial data stored in the memory to a local device, until the usage rate becomes less than the threshold.

2. The accelerator control device according to claim 1, wherein the processor is configured to execute the computer program to select the partial data to be evacuated to the local device in accordance with a least recently used (LRU) algorithm.

3. The accelerator control device according to claim 1, wherein the processor is configured to execute the computer program to
decide, when in the program, the data are declared as the temporary data or description of the data does not exist, the data as the temporary data.

4. The accelerator control device according to claim 1, wherein the processor is configured to execute the computer program to generate the processing flow information represented by a directed acyclic graph.

5. An accelerator control method comprising, by an information processing device which has a storage for storing metadata representing a feature of the partial data:
deciding, in processing flow information representing a flow that tasks generated by a program executed by an accelerator process data being inputted to the tasks and outputted from the tasks, temporary data temporarily generated during execution of the program from among the data;
determining, based on an execution status of the task by the accelerator and the processing flow information, whether or not execution is completed for all the tasks using decided data decided from among the temporary data;
deleting, when the execution is completed for all the tasks using the decided data, the decided data stored in a memory accessible by the accelerator by processing executed by the tasks;
dividing the tasks into subtasks by analyzing the processing flow information, dividing the data into partial data being inputted to the subtasks and outputted from the subtasks, then generating the processing flow information including the subtasks and the partial data, and deciding the temporary data from among the partial data;
determining whether or not execution is completed for all the subtasks using decided partial data decided from among the temporary data;
deleting, when the execution is completed for all the subtasks using the decided partial data, the decided partial data stored in the memory by processing executed by the subtasks;
generating the metadata by associating the partial data, an identifier indicating that the partial data are the temporary data, the subtasks using the partial data, and a size of the partial data, and storing the metadata being generated in the storage;
ensuring, when the accelerator is controlled in such a way as to execute the subtasks in order, based on an execution status of the subtasks by the accelerator and the processing flow information, a use area for the subtasks in the memory, based on a size of the partial data used by the subtasks indicated by the metadata; and
controlling, when a usage rate of the memory is equal to or larger than a threshold, the accelerator in such a way as to evacuate the partial data stored in the memory to a local device, until the usage rate becomes less than the threshold.

6. A non-transitory computer-readable recording medium storing an accelerator control program that causes a computer to execute, the computer having a storage for storing metadata representing a feature of the partial data:
    processing of deciding, in processing flow information representing a flow that tasks generated by a program executed by an accelerator process data being inputted to the tasks and outputted from the tasks, temporary data temporarily generated during execution of the program from among the data;
    processing of determining, based on an execution status of the tasks by the accelerator and the processing flow information, whether or not execution is completed for all the tasks using decided data decided from among the temporary data;
    processing of deleting, when the execution is completed for all the tasks using the decided data, the decided data stored in a memory accessible by the accelerator by processing executed by the tasks;
    processing of dividing the tasks into subtasks by analyzing the processing flow information, dividing the data into partial data being inputted to the subtasks and outputted from the subtasks, then generating the processing flow information including the subtasks and the partial data, and deciding the temporary data from among the partial data;
    processing of determining whether or not execution is completed for all the subtasks using decided partial data decided from among the temporary data;
    processing of deleting, when the execution is completed for all the subtasks using the decided partial data, the decided partial data stored in the memory by processing executed by the subtasks;
    processing of generating the metadata by associating the partial data, an identifier indicating that the partial data are the temporary data, the subtasks using the partial data, and a size of the partial data, and storing the metadata being generated in the storage;
    processing of ensuring, when the accelerator is controlled in such a way as to execute the subtasks in order, based on an execution status of the subtasks by the accelerator and the processing flow information, a use area for the subtasks in the memory, based on a size of the partial data used by the subtasks indicated by the metadata; and
    processing of controlling, when a usage rate of the memory is equal to or larger than a threshold, the accelerator in such a way as to evacuate the partial data stored in the memory to a local device, until the usage rate becomes less than the threshold.

* * * * *